United States Patent
Jiva et al.

(10) Patent No.: US 8,301,672 B2
(45) Date of Patent: Oct. 30, 2012

(54) GPU ASSISTED GARBAGE COLLECTION

(75) Inventors: Azeem S. Jiva, Austin, TX (US); Gary R. Frost, Driftwood, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 572 days.

(21) Appl. No.: 12/235,187

(22) Filed: Sep. 22, 2008

(65) Prior Publication Data
US 2010/0082930 A1    Apr. 1, 2010

(51) Int. Cl.
G06F 12/00    (2006.01)
G06F 17/30    (2006.01)

(52) U.S. Cl. ............... 707/817; 707/816; 707/819
(58) Field of Classification Search .............. None
See application file for complete search history.

(56) References Cited

U.S. PATENT DOCUMENTS

| | | | |
|---|---|---|---|
| 4,775,932 A * | 10/1988 | Oxley et al. ............... | 1/1 |
| 4,989,134 A | 1/1991 | Shaw | |
| 5,136,706 A | 8/1992 | Courts | |
| 5,355,483 A | 10/1994 | Serlet | |
| 5,530,850 A * | 6/1996 | Ford et al. ............... | 1/1 |
| 5,551,003 A | 8/1996 | Mattson et al. | |
| 5,560,003 A | 9/1996 | Nilsen et al. | |
| 5,561,786 A | 10/1996 | Morse | |
| 5,652,883 A | 7/1997 | Adcock | |
| 5,687,368 A * | 11/1997 | Nilsen ................... | 1/1 |
| 5,751,613 A | 5/1998 | Doty et al. | |
| 6,081,665 A | 6/2000 | Nilsen et al. | |
| 6,199,075 B1 * | 3/2001 | Ungar et al. ............... | 1/1 |
| 6,300,962 B1 | 10/2001 | Wishoff et al. | |
| 6,470,361 B1 | 10/2002 | Alpern et al. | |
| 6,526,422 B1 | 2/2003 | Flood et al. | |
| 6,560,619 B1 | 5/2003 | Flood et al. | |
| 6,681,306 B1 * | 1/2004 | Kessler et al. .......... | 711/171 |
| 6,760,815 B1 * | 7/2004 | Traversat et al. ....... | 711/135 |

(Continued)

FOREIGN PATENT DOCUMENTS
WO    WO2010034035    3/2010

OTHER PUBLICATIONS

Applying priorities to memory allocation, Robertz et al, ISMM'02, Jun. 20-21, 2002.*

(Continued)

*Primary Examiner* — Pierre Vital
*Assistant Examiner* — Augustine K Obisesan
(74) *Attorney, Agent, or Firm* — Rory D. Rankin; Meyertons, Hood, Kivlin, Kowert & Goetzel, P.C.

(57) ABSTRACT

A system and method for efficient garbage collection. A general-purpose central processing unit (CPU) sends a garbage collection request and a first log to a special processing unit (SPU). The first log includes an address and a data size of each allocated data object stored in a heap in memory corresponding to the CPU. The SPU has a single instruction multiple data (SIMD) parallel architecture and may be a graphics processing unit (GPU). The SPU efficiently performs operations of a garbage collection algorithm due to its architecture on a local representation of the data objects stored in the memory. The SPU records a list of changes it performs to remove dead data objects and compact live data objects. This list is subsequently sent to the CPU, which performs the included operations.

21 Claims, 7 Drawing Sheets

U.S. PATENT DOCUMENTS

| | | | |
|---|---|---|---|
| 6,763,440 | B1 | 7/2004 | Traversat et al. |
| 6,804,762 | B1 | 10/2004 | Dussud et al. |
| 6,823,351 | B1 | 11/2004 | Flood et al. |
| 6,826,583 | B1 | 11/2004 | Flood et al. |
| 6,839,725 | B2 | 1/2005 | Agesen et al. |
| 6,865,585 | B1 | 3/2005 | Dussud |
| 6,868,488 | B2 | 3/2005 | Garthwaite |
| 6,901,587 | B2 | 5/2005 | Kramskoy et al. |
| 6,931,423 | B2 | 8/2005 | Sexton et al. |
| 6,996,590 | B2 | 2/2006 | Borman |
| 7,010,555 | B2 | 3/2006 | Blandy et al. |
| 7,016,923 | B2 | 3/2006 | Garthwaite |
| 7,017,162 | B2 | 3/2006 | Smith et al. |
| 7,024,436 | B2 | 4/2006 | Kolodner et al. |
| 7,031,990 | B2 | 4/2006 | Garthwaite |
| 7,051,056 | B2 | 5/2006 | Rodriguez-Rivera |
| 7,065,617 | B2 | 6/2006 | Wang |
| 7,069,280 | B2 | 6/2006 | Garthwaite |
| 7,408,782 | B2 | 8/2008 | Austin et al. |
| 7,412,466 | B1 | 8/2008 | Garthwaite |
| 2004/0039759 | A1 | 2/2004 | Detlefs et al. |
| 2004/0078381 | A1 | 4/2004 | Blandy et al. |
| 2004/0111445 | A1 | 6/2004 | Garthwaite et al. |
| 2004/0111718 | A1 | 6/2004 | Detlefs |
| 2004/0128329 | A1 | 7/2004 | Ben-Yitzhak et al. |
| 2004/0133759 | A1* | 7/2004 | Sekiguchi ............. 711/170 |
| 2004/0162860 | A1 | 8/2004 | Detlefs |
| 2004/0162861 | A1 | 8/2004 | Detlefs |
| 2005/0114844 | A1* | 5/2005 | Betancourt et al. ........ 717/128 |
| 2005/0132374 | A1 | 6/2005 | Flood et al. |
| 2005/0149686 | A1 | 7/2005 | Bacon et al. |
| 2005/0166028 | A1 | 7/2005 | Chung et al. |
| 2005/0198079 | A1 | 9/2005 | Heeb |
| 2005/0235120 | A1 | 10/2005 | Dussud |
| 2005/0240943 | A1 | 10/2005 | Smith et al. |
| 2005/0273567 | A1 | 12/2005 | Blandy |
| 2005/0278497 | A1 | 12/2005 | Pliss et al. |
| 2006/0059453 | A1 | 3/2006 | Kuck et al. |
| 2006/0092161 | A1 | 5/2006 | Meeker |
| 2007/0255909 | A1 | 11/2007 | Gschwind et al. |
| 2008/0162611 | A1* | 7/2008 | Wolczko et al. ............ 707/206 |

OTHER PUBLICATIONS

Efficient garbage collection schemes for casual message logging with independent checkpointing, Ahn et al, The journal of super computing, pp. 175-196, 2002.*

Concurrent Garbage Collection Using Hardware-Assisted Profiling, Heil et al, ACM 2000, pp. 80-93.*

Wilson, Paul R., "Uniprocessor Garbage Collection Techniques," Technical Report, The University of Texas, Jan. 1994.

Hudson, et al., "Incremental Collection of Mature Objects," Proceedings of the Int'l Workshop on Memory Management, 1992, 16 pages.

Printezis, et al. "A Generational Mostly-Concurrent Garbage Collector," 1998, 12 pages.

Lieberman, et al., "A Real-Time Garbage Collector Based on the Lifetimes of Objects," Communications of the ACM, Jun. 1983, vol. 26, No. 6, pp. 419-429.

Detlefs, et al., "Garbage-First Garbage Collection," Sun Microsystems, Inc., 2004, pp. 37-48.

Bacon, et al., "The Metronome: A Simpler Approach to Garbage Collection in Real-Time Systems," Springer-Verlag Berlin Heidelberg 2003, pp. 466-478.

Sachindran, et al., "Mark-Copy: Fast Copying GC with Less Space Overhead," ACM, 2003, 18 pages.

Hallenberg, et al., "Combining Region Inference and Garbage Collection", PLDI '02, Jun. 17-19, 2002, Berlin, Germany.

"Garbage Collection"; Sep. 27, 2004; 7 pages; printed off website www.memorymanagement.org.

Edwards; "Artificial Intelligence Project-RLE and MIT Computation Center"; Memo 19-LISP II Garbage Collector; 2 pages.

Abuaiadh, et al; "An Efficient Parallel Heap Compaction Algorithm"; OOPSLA'04; Oct. 24-28, 2004; pp. 224-236; Vancouver, British Columbia, Canada.

Agesen, et al; "An Efficient Meta-Lock for Implementing Ubiquitous Synchronization"; Sun Microsystems; Apr. 1999; pp. 1-27; SMLI TR-99-76; Palo Alto, CA; USA.

Agesen, et al; "Mixed-mode Bytecode Execution"; Sun Microsystems; Jun. 2000; pp. 1-20; SMLI TR-2000-87; Palo Alto, CA; USA.

Agesen; "GC Points in a Threaded Environment"; Sun Microsystems; Dec. 1998; pp. 1-20; SMLI TR-98-70; Palo Alto, CA; USA.

Ben-Yitzhak, et al; "An Algorithm for Parallel Incremental Compaction"; IBM Haifa Research Laboratory, Mount Carmel; Jun. 20-21, 2002; pp. 100-105; Berlin, Germany.

Appel; "Simple Generational Garbage Collection and Fast Allocation"; Department of Computer Science-Princeton Universtiy; Mar. 1998; 16 pages; Princeton, N.J., USA.

Detlefs, et al; "Inlining of Virtual Methods"; Sun Microsystems Laboratories; 21 pages; Burlington, MA, USA.

Flood, et al; "Parallel Garbage Collection for Shared Memory Multiprocessors"; Sun Microsystems; Apr. 2001; USA.

Martin Larose and Marc Freeley, A Compacting Incremental Collector and its Performance in a Production Quality Compiler, Oct. 1998, Proceedings of the 1st International Symposium on Memory Management ISMM '98, vol. 34, Issue 3.

International Search Report and Written Opinion for PCT/US2009/058081 mailed Dec. 30, 2009.

* cited by examiner

GPU ASSISTED GARBAGE COLLECTION

BACKGROUND OF THE INVENTION

1. Field of the Invention

This invention relates to high performance computing systems, and more particularly, to maintaining efficient computer garbage collection.

2. Description of the Relevant Art

When software programmers write applications to perform work according to an algorithm or a method, the programmers utilize variables to reference temporary and result data. This data, which may be referred to as data objects, requires that space be allocated in computer memory. During execution of one or more applications, the amount of computer memory unallocated, or free, for data object allocation may decrease to a suboptimal level. This reduced amount of free space may decrease system performance and, eventually, there may not be any free space available.

Rather than place the burden on the programmer to manage memory during application development, which increases design effort and time and may lead to runtime errors, automatic memory management techniques may be utilized. Automatic memory management methods release data objects that are no longer needed during application execution. Garbage collection is a general term used to describe the different methods and algorithms utilized to reclaim allocated memory that won't be used again during application execution.

Besides ensuring there is enough memory space for applications to execute, which can remove physical memory leaks, garbage collection has other benefits. For example, garbage collection removes the burden of manual memory management, such as memory allocation and deallocation, from the software programmer, and it reduces or removes the number of certain errors, such as dangling pointer errors.

However, garbage collection is a time consuming task. A general algorithm used to perform this task is to divide the entire memory into sets, wherein each set has one or more data objects. One set may be designated as a condemned set, or a set of data objects that have been determined to be candidates for recycling, or data objects with memory locations that can be reclaimed. The algorithm may be generally described as choosing a condemned set, scanning data objects that have not been condemned, determining which data objects within the condemned set are reachable, or referenced by variables within a processor core executing an application, and reclaiming the data objects that were not reachable. Some algorithms may copy some or all of the reachable data objects into a new area of memory, updating all references to those data objects as needed. Besides requiring time to perform all of these actions, the algorithm requires cache space during its execution, which may require evicting useful information to be used once the algorithm has finished and applications may resume.

Due to being a time consuming task, an automatic garbage collector requires a system to pause while the collector performs its tasks. If the garbage collector is run in real-time, or concurrently with the execution of applications, then the length of this pause may be unacceptable for some applications. Examples of some critical applications include online stock trading, e-commerce applications, and multimedia applications such as movies and video games.

In view of the above, efficient methods and mechanisms for maintaining efficient computer garbage collection in real-time is desired.

SUMMARY OF THE INVENTION

Systems and methods for efficient garbage collection are contemplated.

In one embodiment, a processing node, that may have all circuitry integrated on a single die, is provided comprising a general-purpose central processing unit (CPU), a special processing unit (SPU), and a memory. The SPU has a single instruction multiple data (SIMD) parallel architecture and may be a graphics processing unit (GPU). In response to determining a garbage collection initiate condition is satisfied, the CPU sends a garbage collection request and a first log to the SPU. The first log includes an address and a data size of each allocated data object stored in a heap in memory.

The SPU performs operations of a garbage collection algorithm on a local representation of the data objects in the memory. Also, the SPU records the latter operations, such as the deletion of dead data objects and the moving for compaction purposes of the live data objects. This list of recorded operations is sent to the CPU. Due to the parallel architecture of the SPU, the SPU is able to iterate through the algorithm operations efficiently. By having the CPU only perform the latter operations, the burden and inefficiency is removed from the CPU. Performance increases and includes needed minimal disruption of a multimedia application. Also, the cache subsystem of the CPU is not used for the majority of the algorithm operations, and, therefore, cache locality is improved compared to prior art methods.

In another embodiment, a CPU of a first processing node may send a garbage collection request with an accompanying first log via a network connection to a SPU located in a second processing node. The SPU performs a scaling in order to map a smaller number of bytes in a local memory of the SPU to a larger number of bytes in the memory of the first processing node. The majority of the garbage collection algorithm is performed by the SPU as described above in order to offload the CPU, which is not designed to be efficient with highly parallel tasks.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Figure 1:
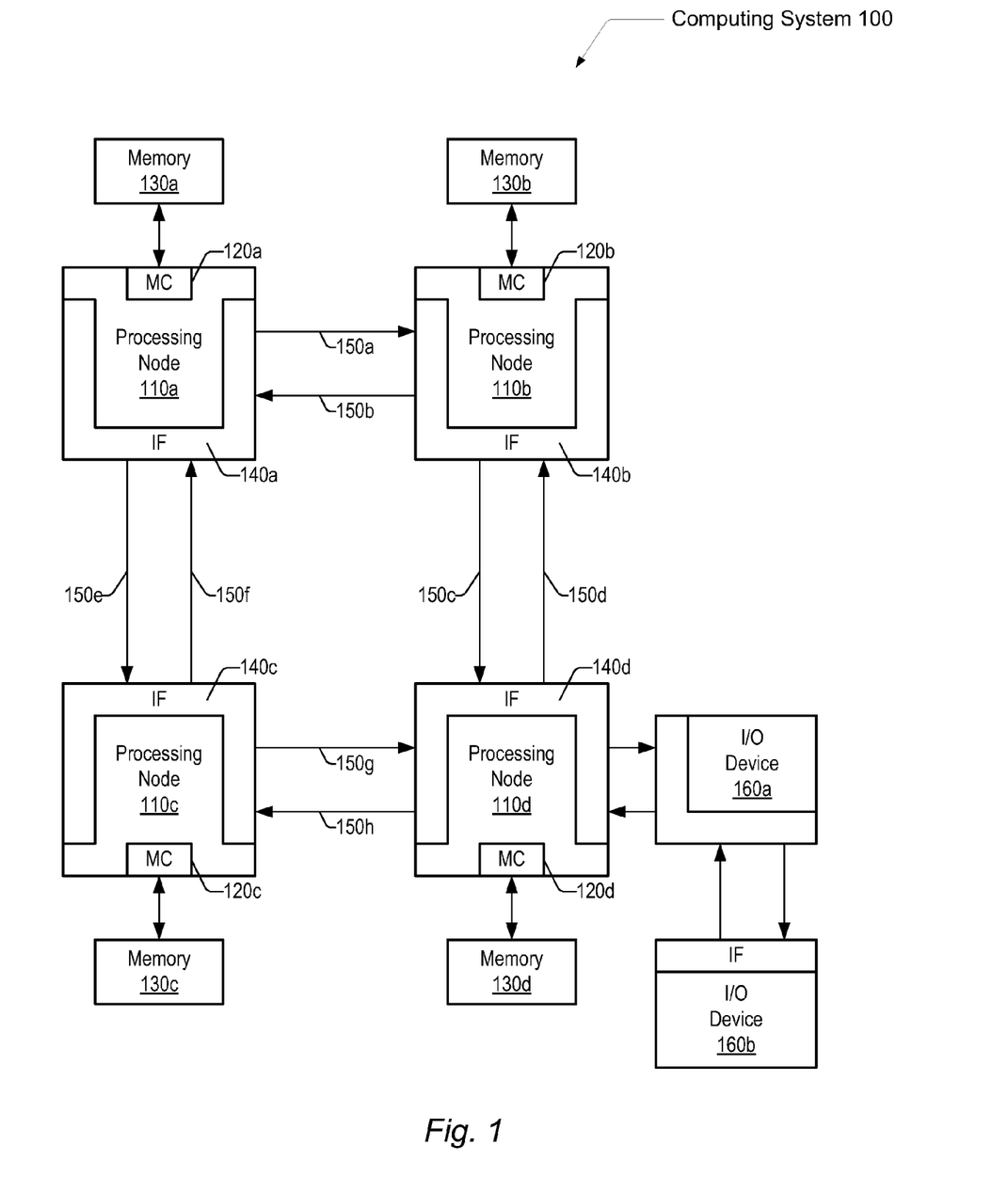
FIG. 1 is a generalized block diagram illustrating one embodiment of a computing system.

Referring to FIG. 1, one embodiment of a computing system 100 is shown. Computing system 100 includes a plurality of processing nodes 110a-110d. Although four nodes are shown in FIG. 1, other embodiments may comprise a different number of nodes each comprising one or more processor cores. As used herein, elements referred to by a reference numeral followed by a letter may be collectively referred to by the numeral alone. For example, processing nodes 110a-110d may be collectively referred to as processing nodes 110, or nodes 110. Each node 110 may be coupled to a respective memory 130 via a respective memory controller 120. Additionally, each processing node 110 may include interface logic 140 used to communicate with others of the processing nodes 110. For example, processing node 110a includes interface logic 140a for communicating with processing nodes 110b and 110c. Similarly, processing node 110b includes interface logic 140b for communicating with processing nodes 110a and 110d, and so on.

In the embodiment of FIG. 1, processing node 110d is shown coupled to communicate with an input/output (I/O) device 160a via interface logic 140d, and I/O device 160a is further coupled to a second I/O device 160b. Other processing nodes may communicate with other I/O devices in a similar fashion. Alternatively, a processing node may communicate with an I/O bridge, which is coupled to an I/O bus.

Computing system 100 may implement a packet-based link for inter-node communication. In the depicted embodiment, the link is implemented as sets of unidirectional lines (e.g. lines 150a are used to transmit packets from processing node 110a to processing node 110b and lines 150b are used to transmit packets from processing node 110b to processing node 110a). Other sets of lines 150c-150h are used to transmit packets between other processing nodes as illustrated in FIG. 1. The link may be operated in a cache coherent fashion for communication between processing nodes or in a noncoherent fashion as a daisy-chain structure between I/O devices 160a-160b (and additional I/O devices, as desired). It is noted that a packet to be transmitted from one processing node 110 to another may pass through one or more intermediate nodes. For example, a packet transmitted by processing node 110a to processing node 110d may pass through either processing node 110b or processing node 110c as shown in FIG. 1. Any suitable routing algorithm may be used. Other embodiments of computing system 100 may include more or fewer processing nodes than the embodiment shown in FIG. 1. In addition, other embodiments are possible in which each processing node is coupled to every other processing node through a point-to-point network.

In addition to the depicted memory controller and interface logic, each processing node 110 may include one or more processors and associated caches, as described further below. Broadly speaking, a processing node 110 comprises at least one processor and may optionally include a memory controller for communicating with a memory and other logic, as desired.

Memories 130 may comprise any suitable memory devices. For example, a memory 130 may comprise one or more RAMBUS dynamic random access memories (DRAMs), synchronous DRAMs (SDRAMs), DRAM, static RAM, etc. The address space of computing system 100 is divided among memories 130. Each processing node 110 may include a memory map used to determine which addresses are mapped to which memories 130, and hence to which processing node 110 a memory request for a particular address should be routed. In one embodiment, the coherency point for an address within computing system 100 is the memory controller 120 coupled to the memory storing bytes corresponding to the address. Memory controllers 120 may comprise control circuitry for interfacing to memories 130. Additionally, memory controllers 120 may include request queues for queuing memory requests.

Generally, interface logic 140 may comprise buffers for receiving packets from the link and for buffering packets to be transmitted upon the link. Computing system 100 may employ any suitable flow control mechanism for transmitting packets. I/O devices 160 are illustrative of any desired peripheral devices. For example, I/O devices 160 may comprise network interface cards, video accelerators, audio cards, hard or floppy disk drives or drive controllers, Small Computer Systems Interface (SCSI) adapters and telephony cards, modems, sound cards, and a variety of data acquisition cards such as General Purpose Interface Bus (GPIB) or field bus interface cards.

Figure 2:
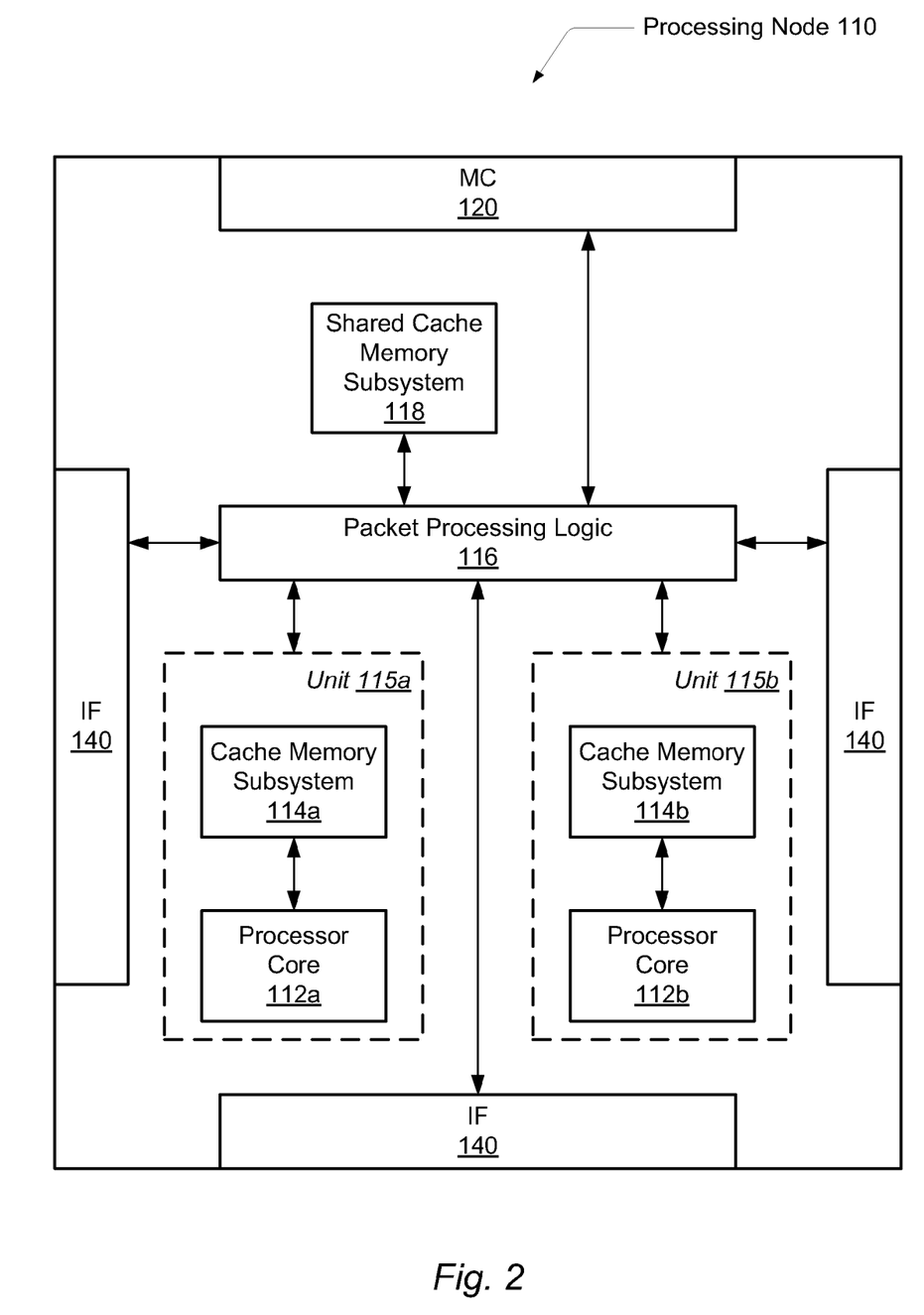
FIG. 2 is a generalized block diagram illustrating one embodiment of an exemplary processing node.

FIG. 2 is a block diagram of one embodiment of an exemplary processing node 110. Circuit portions that correspond to those of FIG. 1 are numbered identically. Processing node 110 may include memory controller 120, interface logic 140, one or more processing units 115, which may include one or more processor cores 112 and a corresponding cache memory subsystems 114; packet processing logic 116, and a shared cache memory subsystem 118. In one embodiment, the illustrated functionality of processing node 110 is incorporated upon a single integrated circuit.

Generally, packet processing logic 116 is configured to respond to control packets received on the links to which processing node 110 is coupled, to generate control packets in response to processor cores 112 and/or cache memory subsystems 114, to generate probe commands and response packets in response to transactions selected by memory controller 120 for service, and to route packets for which node 110 is an intermediate node to other nodes through interface logic 140. Interface logic 140 may include logic to receive packets and synchronize the packets to an internal clock used by packet processing logic 116.

Cache subsystems 114 and 118 may comprise high speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches which are nearer processor cores 112 (within the hierarchy) may be integrated into processor cores 112, if desired. In one embodiment, cache memory subsystems 114 each represent L2 cache structures, and shared cache subsystem 118 represents an L3 cache structure.

Both the cache memory subsystem 114 and the shared cache memory subsystem 118 may include a cache memory coupled to a corresponding cache controller. Processor cores 112 include circuitry for executing instructions according to a predefined general-purpose instruction set. For example, the x86 instruction set architecture may be selected. Alternatively, the Alpha, PowerPC, or any other general-purpose instruction set architecture may be selected. Generally, processor core 112 accesses the cache memory subsystems 114, respectively, for data and instructions. If the requested block is not found in cache memory subsystem 114 or in shared cache memory subsystem 118, then a read request may be generated and transmitted to the memory controller within the node to which the missing block is mapped.

Figure 3:
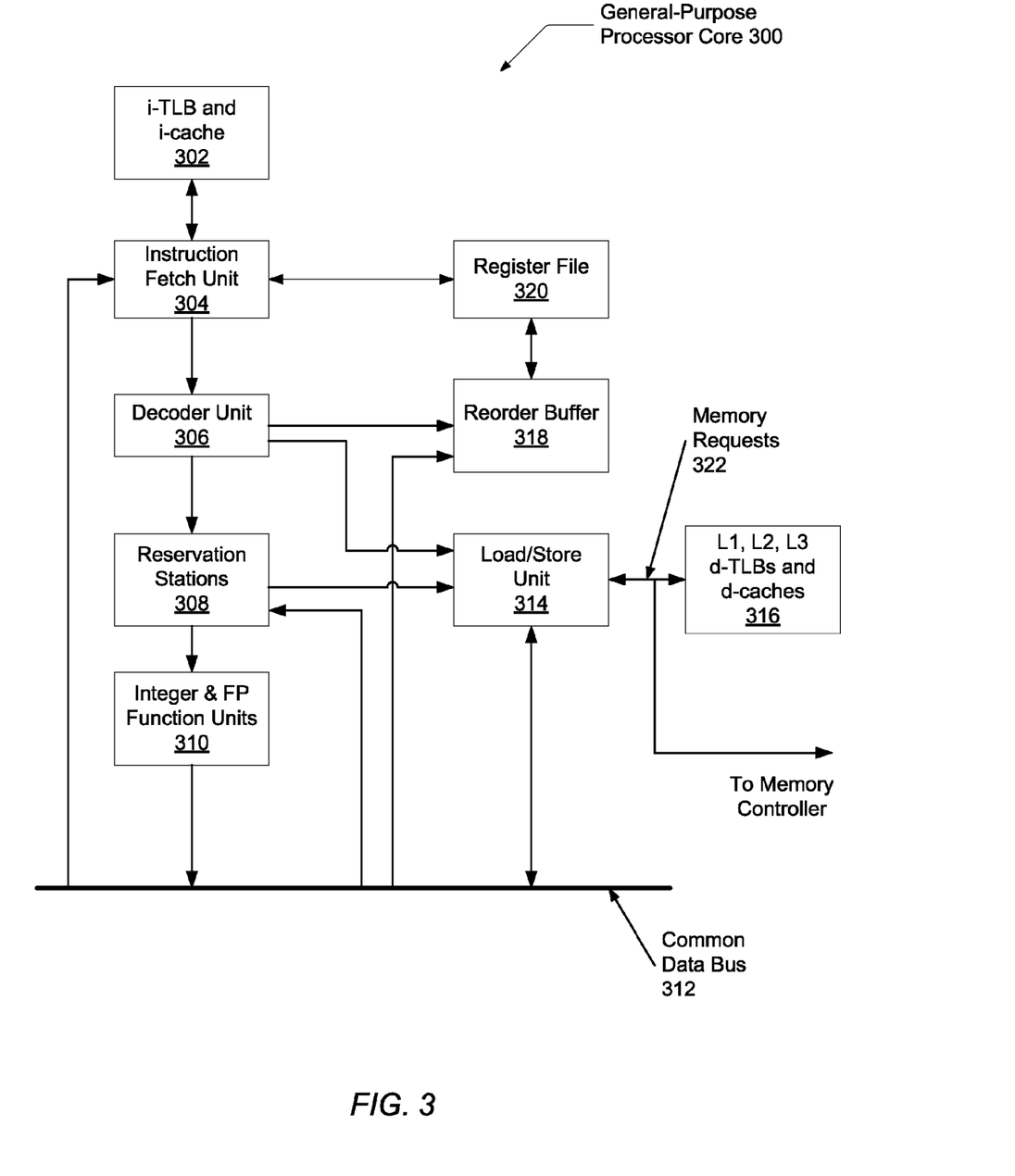
FIG. 3 is a generalized block diagram of one embodiment of a general-purpose processor core.

FIG. 3 illustrates one embodiment of a general-purpose processor core 300 that performs out-of-order execution. An instruction-cache (i-cache) and corresponding translation-lookaside-buffer (TLB) 302 may store instructions for a software application and addresses in order to access the instructions. The instruction fetch unit (IFU) 304 may fetch multiple instructions from the i-cache 302 per clock cycle if there are no i-cache misses. The IFU 304 may include a program counter that holds a pointer to an address of the next instructions to fetch in the i-cache 302, which may be compared to addresses in the i-TLB. The IFU 304 may also include a branch prediction unit to predict an outcome of a conditional instruction prior to an execution unit determining the actual outcome in a later pipeline stage.

The decoder unit 306 decodes the opcodes of the multiple fetched instructions and may allocate entries in an in-order retirement queue, such as reorder buffer 318, in reservation stations 308, and in a load/store unit 314. The allocation of entries in the reservation stations 308 is considered dispatch. The reservation stations 308 may act as an instruction queue where instructions wait until their operands become available. When operands are available and hardware resources are also available, an instruction may be issued out-of-order from the reservation stations 308 to the integer and floating point functional units 310 or to the load/store unit 314. Memory accesses such as load and store operations are issued to the load/store unit 314. The functional units 310 may include arithmetic logic units (ALU's) for computational calculations such as addition, subtraction, multiplication, division, and square root. Logic may be included to determine an outcome of a conditional instruction. The load/store unit 314 may include queues and logic to execute a memory access instruction. Also, verification logic may reside in the load/store unit 314 to ensure a load instruction receives forwarded data from the correct youngest store instruction.

The load/store unit 314 may send memory access requests 322 to the one or more levels of data cache (d-cache) 316 on the chip. Each level of cache may have its own TLB for address comparisons with the memory requests 322. Each level of cache 316 may be searched in a serial or parallel manner. If the requested memory line is not found in the caches 316, then a memory request 322 is sent to the memory controller in order to access the memory line in system memory off-chip. The serial or parallel searches, the possible request to the memory controller, and the wait for the requested memory line to arrive may require a substantial number of clock cycles.

Results from the functional units 310 and the load/store unit 314 may be presented on a common data bus 312. The results may be sent to the reorder buffer 318. In one embodiment, the reorder buffer 318 may be a first-in first-out (FIFO) queue that ensures in-order retirement of instructions according to program order. Here, an instruction that receives its results is marked for retirement. If the instruction is head-of-the-queue, it may have its results sent to the register file 320. The register file 320 may hold the architectural state of the general-purpose registers of processor core 300. Then the instruction in the reorder buffer may be retired in-order and its head-of-queue pointer may be adjusted to the subsequent instruction in program order.

The results on the common data bus 312 may be sent to the reservation stations 308 in order to forward values to operands of instructions waiting for the results. For example, an arithmetic instruction may have operands that depend on the results of a previous arithmetic instruction, or a load instruction may need an address calculated by an address generation unit (AGU) in the functional units 310. When these waiting instructions have values for their operands and hardware resources are available to execute the instructions, they may be issued out-of-order from the reservation stations 308 to the appropriate resources in the functional units 310 or the load/store unit 314.

Uncommitted, or non-retired, memory access instructions have entries in the load/store unit. The forwarded data value for an in-flight, or uncommitted, load instruction from the youngest uncommitted older store instruction may be placed on the common data bus 112 or simply routed to the appropriate entry in a load buffer within the load/store unit 314. It is noted that although a general-purpose processor core, such as core 300, may execute instructions of a highly parallel algorithm, such as a single instruction multiple data (SIMD) application, it may be less efficient than a special processing core with a parallel architecture such as a SIMD core. Examples of special processing cores with a parallel architecture include digital signal processors (DSPs), graphics processing units (GPUs), or other.

An operating system on a multi-processor system, which may, for example, reprise the resources of system 100 and/or 110, allocates regions of memory for a software application. When a software application is compiled, the application may comprise multiple processes. In such an embodiment, each process may own its own resources such as an image of memory, or an instance of instructions and data before application execution. Also, each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

Figure 4:
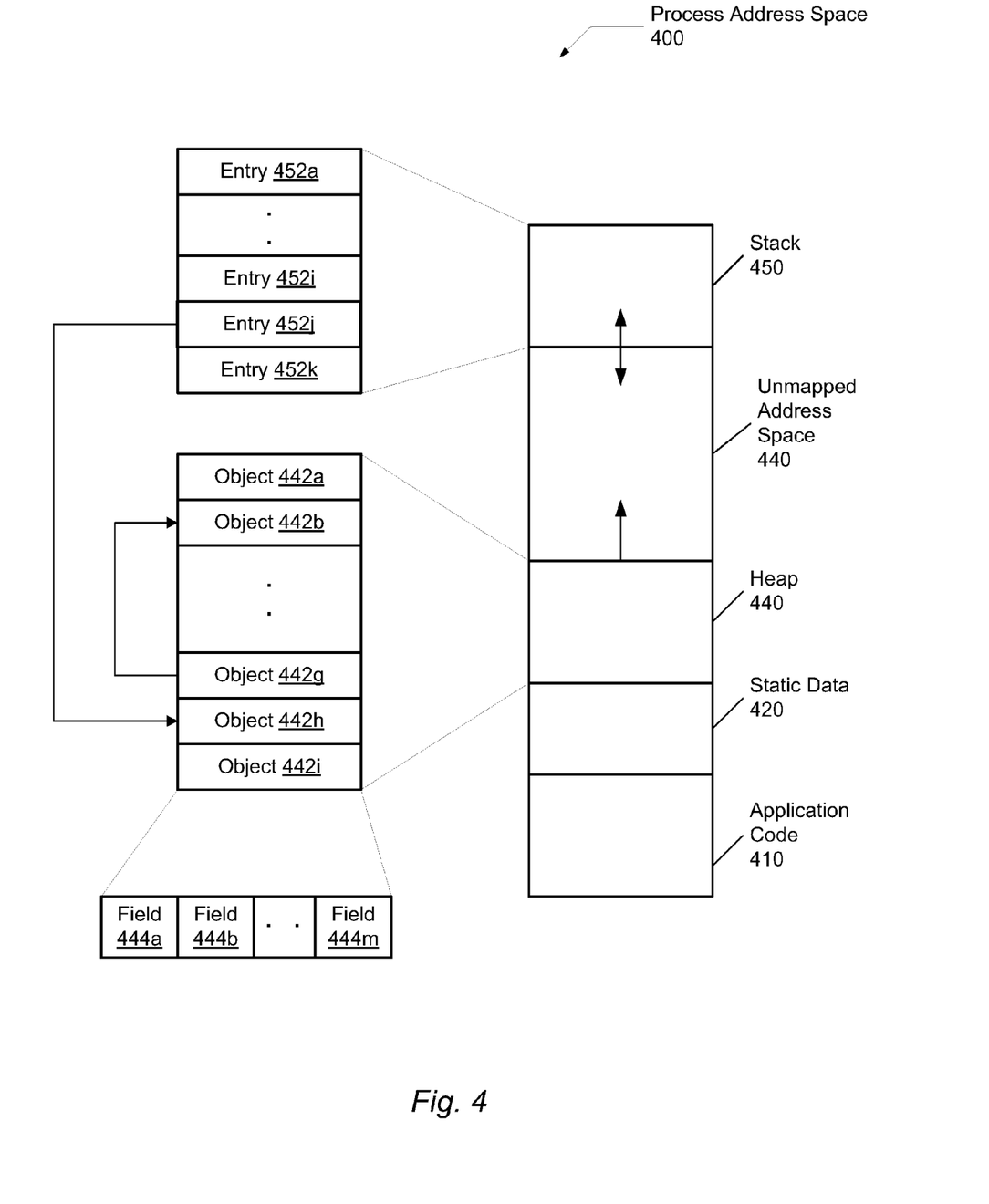
FIG. 4 is a generalized block diagram of one embodiment of a process address space.

Referring to FIG. 4, one embodiment of a generalized process address space 400 is shown. Modern computing systems use virtual memory in order to share a smaller amount of physical memory among many processes. Address space 400 may be a contiguous virtual address space, wherein a mapping between virtual addresses and physical addresses determines the location of values 410-450 in physical memory or disk. Generally speaking, for a given software application, the kernel of an operating system sets up an address space 400 for the application, loads the application's code 410 into memory, sets up a stack 450 for the program, branches to a given location inside the application code 410, and begins execution of the application code 410. In some embodiments, not all code 410 and data 420 need to be stored in physical memory before execution begins.

How a software application uses an instruction set architecture (ISA) is affected by the interaction of compilers and high-level languages. For example, for software application development, it needs to be known how variables are allocated and addressed and how many registers are needed to allocate variables. In one embodiment, the static data 420, stack 450, and heap 440 determine data allocation.

Static data 420 may be used to allocate statically declared objects, such as global variables and constants. A majority of these objects may be arrays. Stack 450 may be used to allocate scalar variables rather than arrays, such as local variables and parameters in the functions currently being invoked. Stack 450 may be grown and shrunk on procedure call or return, respectively. Heap 440 may be used to allocate dynamic objects accessed with pointers and are typically not scalar variables. Heap 440 may be used to reduce the frequency of copying the contents of strings and lists by storing the contents of temporary strings or lists during the string/list operations. The heap is not affected by the return of the function call.

A simple example of a method in source code that illustrates the use of the stack 450 and heap 440 follows,

```
class Students {                        /* line 1 */
    public string name;
    public int score;
}
public void Classroom ( ) {             /* line 5 */
    Students jeff = new Students( );
    jeff.name = "Jeff";
    jeff.score = 82;
}                                        /* line 9 */
```

The above example has a class called Students, and the Students class includes two public fields—name and score. The Students class is accessed by the Classroom method. Inside the Classroom method, an object named jeff is created of type Students. The object's name and score fields are initialized. In one embodiment, after executing this code example, stack 450 contains the Classroom method call in, for example, entry 452*j* in FIG. 4. An entry for the object jeff may be included in entry 452*k* in FIG. 4. The object jeff may not point to a value, but rather it may reference the object 442*h* in heap 440. Object 442*h* may store the Students object, which is a class, or reference type. Field 444*a* of object 442*h* may store the name field value and field 444*b* may store the score field value.

After the Classroom method has finished executing, stack 450 may pop entry 452*j* since this entry only contains information on code that is executing or will be executing. With nothing remaining to execute in this example, which may represent only a portion of an entire application, stack 450 may have a stack pointer adjusted to now point to entry 452*i*, rather than entry 452*j*. The heap, on the other hand, may still contain data in fields 444*a* and 444*b* of object 442*h*.

At a later time, a garbage collection algorithm may be executed in order to clear unreferenced (unused) data from heap 440. For example, the Students class above may be removed from object 442*h* because it is no longer being used.

Although not used in the above example, it is shown in FIG. 4 that object 442*b* is referenced by a pointer in object 442*g* in heap 440. When a garbage collector is executed to clear unused data, useful data remains in memory by the garbage collector algorithm. The algorithm may perform graphing, which is developing a list of data objects that need to be kept for later application use. Graphing may begin with roots. Root object references may be defined to consist of static global pointers in static data 420, pointers in stack 450, and any data objects in heap 440 heap that is pointed to by a memory address in the CPU. During a recursive search by the algorithm if object 442*g* is determined to be needed, then object 442*b* may be determined to be needed due to being referenced by a pointer in object 442*g*.

During graphing, objects may be determined to be reachable, wherein a reachable object may be defined as roots and data objects referenced from a reachable object. Reachability is a transitive closure.

A distinction may be drawn between syntactic garbage (data objects the program cannot possibly reach), and semantic garbage (data objects the program will in fact never again use). Examples of both are provided in the following,

```
Object x = new First( );                /* line 10 */
Object y = new Second( );
x = new Third( );
/* Object First will never be accessed - it is syntactic garbage */
if (x.check_something( )) {
    x.do_something(y);                  /* line 15 */
}
System.exit(0);                          /* line 17 */
```

In the above example, the object "y" may be semantic garbage, but it is not known until x.check_something( ) returns a value. Precisely identifying semantic garbage is complex and although conservative heuristic methods for semantic garbage detection remain an active research area, essentially all practical garbage collectors focus on syntactic garbage.

Generally speaking, garbage collection algorithms perform collection in cycles. A cycle is started when the collector decides (or is notified) that it needs to reclaim storage, which may happen when the system is low on memory. The garbage collection algorithm attempts to reclaim garbage, or memory used by objects that will never be accessed or mutated again by the application. A software thread that accesses memory may be referred to as a mutator. A great variety of different garbage collection techniques have been developed and used.

Garbage collection systems have generally suffered to various degrees from the problem of excessive pause times. This problem arises when garbage collection is performed in real-time, i.e., concurrently with the execution of other live programs running on one or more processors. For example, suppose that a system contains multiple mutator threads and a single garbage collection thread. If the mutators are being used for a multimedia application, these threads may need to present the application, such as a movie, at a certain rate. In order to maintain performance, the sum of the time required for the critical path of the application and the time required for the garbage collection algorithm may be limited by the aggressive clock period of the general-purpose processor core.

Generally speaking, the garbage collection algorithm includes the actions of scanning system memory, marking all reachable data objects, which may require recursive searches; deleting data objects determined not to be usable or reachable, and finally, moving the data objects to occupy contiguous locations in memory. This last step may be referred to as compacting. These steps involve parallel execution in that the same operations are performed on different data in a repetitious manner. Rather than utilizing a general-purpose processor core to execute a garbage collection thread or utilizing multiple general-purpose cores to execute a parallel garbage collection algorithm, it may be advantageous to utilize a special processor core with a parallel architecture, such as a single instruction multiple data (SIMD) core. Examples of SIMD cores include graphics processing units (GPUs), digital signal processing (DSP) cores, or other.

Figure 5:
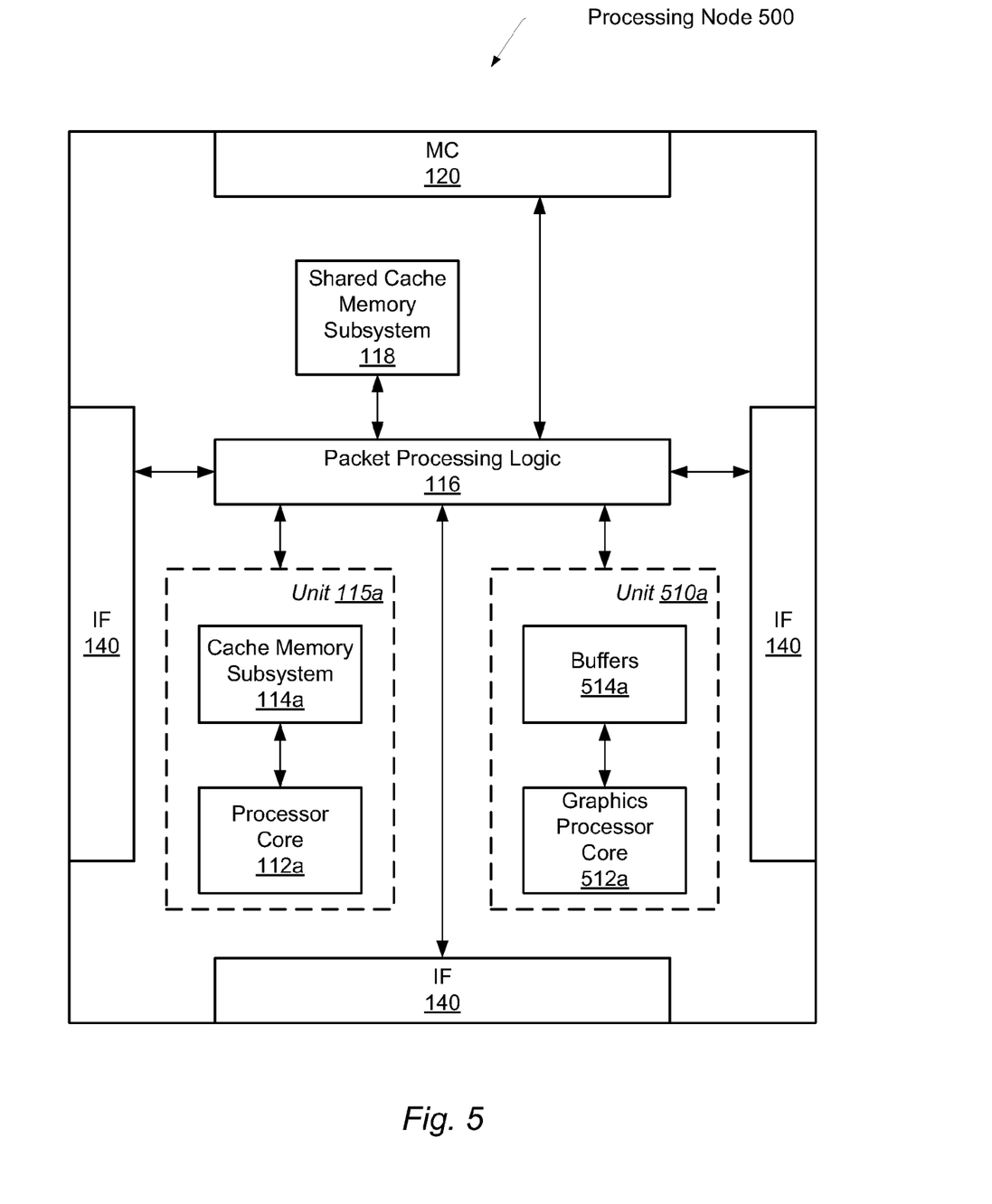
FIG. 5 is a generalized block diagram of one embodiment of an exemplary processing node with a special processing unit with a parallel architecture.

Referring to FIG. 5, one embodiment of an exemplary processing node 500 with a special processing unit with a parallel architecture is shown. Circuit portions that correspond to those of FIG. 2 are numbered identically. Processing node 500 may include one or more special processing units, such as graphics processing units (GPUs) 510, in place of or in addition to general-purpose processing unit 115*b*. GPU 510 may include one or more graphic processor cores 512 and data storage buffers 514. Graphics processing unit (GPU) 119 may be a dedicated graphics rendering device for a personal computer, a workstation, or a video game console. Modern GPUs 119 are very efficient at manipulating and displaying computer graphics, and their highly parallel structure makes them more effective than general-purpose central processing units (CPUs), such as processing unit 115*a*, for a range of complex algorithms. A GPU executes calculations required for graphics and video and the CPU executes calculations for many more system processes than graphics alone.

In one embodiment, a GPU 119 may be located on a video card. In another embodiment, a GPU 119 may be integrated on the motherboard. In yet another embodiment, the illustrated functionality of processing node 400 may be incorporated upon a single integrated circuit. In such an embodiment, processing unit 115*a* and graphics processing unit 119 may be proprietary cores from different design centers. Also, the graphics processing unit 119 may now be able to directly access both local memories 114*a* and 118 and main memory via memory controller 120 from the processing node 500, rather than perform memory accesses off-chip via interface 140. This embodiment may lower latency for memory accesses for the graphics processing unit 119, which may translate into higher graphics performance.

Graphics rendering performed by a GPU 119 includes generating an image from a model, by means of computer programs. The model is a description of three-dimensional objects in a strictly defined language or data structure. It may contain geometry, viewpoint, texture, lighting, and shading information. The image is a digital image or raster graphics image. This raster graphics image or bitmap, is a data structure representing a generally rectangular grid of pixels, or points of color, viewable via a monitor, paper, or other display medium. Some other operations performed by a GPU 119 may include drawing rectangles, triangles, circles, and arcs.

Conventional GPUs 119 use very wide single instruction multiple data (SIMD) architectures to achieve high throughput in image-rendering applications. Such applications generally entail executing the same programs, such as vertex shaders or pixel shaders, on large numbers of objects (vertices or pixels). Since each object is processed independently of other objects, but the same sequence of operations is used, a SIMD architecture provides considerable performance enhancement.

Developments in GPUs 119 include support for programmable shaders, which can manipulate vertices and textures, oversampling and interpolation techniques to reduce aliasing, and very high-precision color spaces. Many of these computations involve matrix and vector operations. Therefore, GPUs 119 have been considered for non-graphical calculations.

Figure 6:
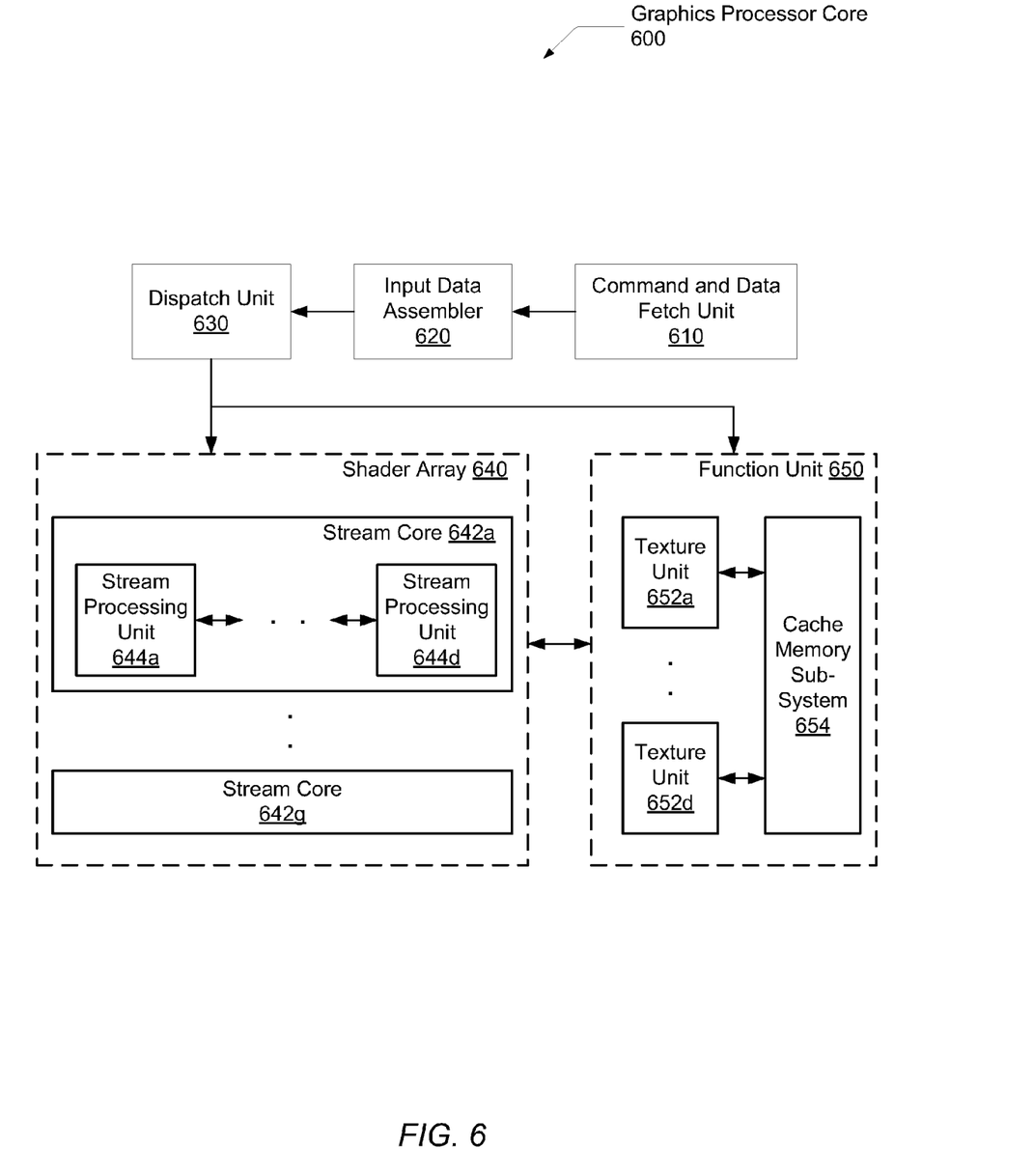
FIG. 6 is a generalized block diagram of one embodiment of a graphics processor core.

Turning now to FIG. 6, a block diagram of one embodiment of a graphics processor core 600 is shown. Core 600 may be modified by those skilled in the art in order to derive alternative embodiments. The blocks in this embodiment are shown with a particular layout. However, the layout of core 600 may differ from the one shown. In other embodiments, some blocks may be integrated, some blocks may have internal functionality and circuitry in another block or in a separate independent block, and some functionality and circuitry may be located in another integrated circuit.

In the embodiment shown, the command and data fetch unit 610 may receive a rendering command stream, state information, and geometry data for floating point operations from a graphics driver on a processor core, such as core 112*a* in FIG. 5. In some embodiments, rather than providing this information directly, a processor core may provide references to locations in memory, such as memory 130 of FIG. 1, at which this information is stored. Accordingly, unit 610 retrieves the information from the specified locations.

The rendering command stream, state information, and geometry data may be used to define the desired rendered image or images, including geometry, lighting, shading, texture, motion, and/or camera parameters for a scene. In one embodiment, the geometry data includes a number of definitions for objects (e.g., a table, a tree, a person or animal) that may be present in the scene. Groups of primitives (e.g., points, lines, triangles and/or other polygons) may be used to model objects. The primitives may be defined by a reference to their vertices. For each vertex, a position may be specified in an object coordinate system, representing the position of the vertex relative to the object being modeled. In addition to a position, each vertex may have various other attributes associated with it. Examples of other vertex attributes may include scalar or vector attributes used to determine qualities such as the color, texture, transparency, lighting, shading, and animation of the vertex and its associated geometric primitives.

Management of objects in a scene may include state management overhead and this overhead may increase if the work is grouped in small batches. In one embodiment, unit 610 may be a processor that offloads work from a graphics driver from a host CPU, such as processing unit 115. Generally, the graphics driver performs the work for this management, but then the processing unit 115 is burdened with this work. Therefore, by strengthening the processing capability of unit 610, the graphics driver, and, consequently, the processing unit 115 may be relieved of overhead operations.

Next, the input data assembler 620 prepares data for processing. Three examples of functions performed by assembler 620 may include vertex assembly for vertex shaders, geometry assembly for geometry shaders, and scan conversion and interpolation for pixel shaders. Each function may submit threads to the dispatch unit 630.

In one embodiment, dispatch unit 630 may divide a received workload into threads and optimally distribute the threads among shader array 640, which includes one or more stream cores 642, and function unit 650, which includes one or more texture units 652. Dispatch unit 630 may determine the moments of idleness of some stream processing units 644 within the ores 642 and assign them new tasks.

Stream processing applications are characterized by the need to process high-volume data streams in a timely and responsive fashion. Such applications can use multiple computational units, such as the floating point units on a GPU, without explicitly managing allocation, synchronization, or communication among those units. Stream processing may simplify parallel software and hardware by restricting the parallel computation that can be performed. A stream, which is a given a set of data, may have a series of operations applied to each element in the stream. Uniform streaming, where one operation is applied to all elements in the stream, is typical. Operations are usually pipelined, and local on-chip memory is reused to minimize external memory bandwidth.

The stream abstractions expose data dependencies, and, therefore, compiler tools can fully automate and optimize on-chip management tasks. Stream processing hardware can use scoreboarding, for example, to launch direct memory accesses (DMAs) at runtime, when dependencies become known. The elimination of manual DMA management reduces software complexity, and the elimination of hardware caches reduces the amount of die area not dedicated to computational units such as arithmetic logic units (ALUs).

Stream processing is driven by a data-centric model that works well for traditional digital signal processing (DSP) or GPU-type applications. Stream processing is not optimal for general-purpose processing with more randomized data accesses, such as databases.

In one embodiment, each stream core 642 is a SIMD core and includes multiple stream processing units (SPU) 644. Each SPU 644 may include multiple ALUs, and, therefore, shader array 640 may have a large amount of computing power. Shader array 640 may execute vertex and/or geometry shader programs on vertex data, with the programs being selected by the provided state information. Shader programs can implement algorithms using a wide range of mathematical and logical operations on vertices and other data, and the programs can include conditional or branching execution paths and direct and indirect memory accesses. A shader program to be used may be stored in system memory 130 or buffers 514 and identified to shader array 640 via suitable rendering commands and state information as is known in the art.

Function unit 650 includes one or more texture units 652 for execution of pixel shader programs for visual effects. In one embodiment, the texture units 652 are aligned with stream cores 642, so that adding more shader power equates to adding more texturing power. Texture units 652 may utilize a cache memory subsystem 654 for data storage during program execution.

A rasterizer and a color assembly, which are not shown, may be included in shader array 640 or function unit 650. These modules may associate primitives and screen coordinates for pixels with attributes of vertices (e.g., color components, texture coordinates, surface normals). Once processing for a pixel or group of pixels is complete, these pixel values may be integrated with pixels of an image under construction. In some embodiments, the new pixel values may be masked or blended with pixels previously written to the rendered image. Buffers that may be distributed in shader array 640, function unit 650, or buffers 514 can also be used to determine any contribution of each incoming pixel to the rendered image. Pixel data may be stored in buffers 514 and then later scanned out to a display device and/or subjected to further processing.

Figure 7:
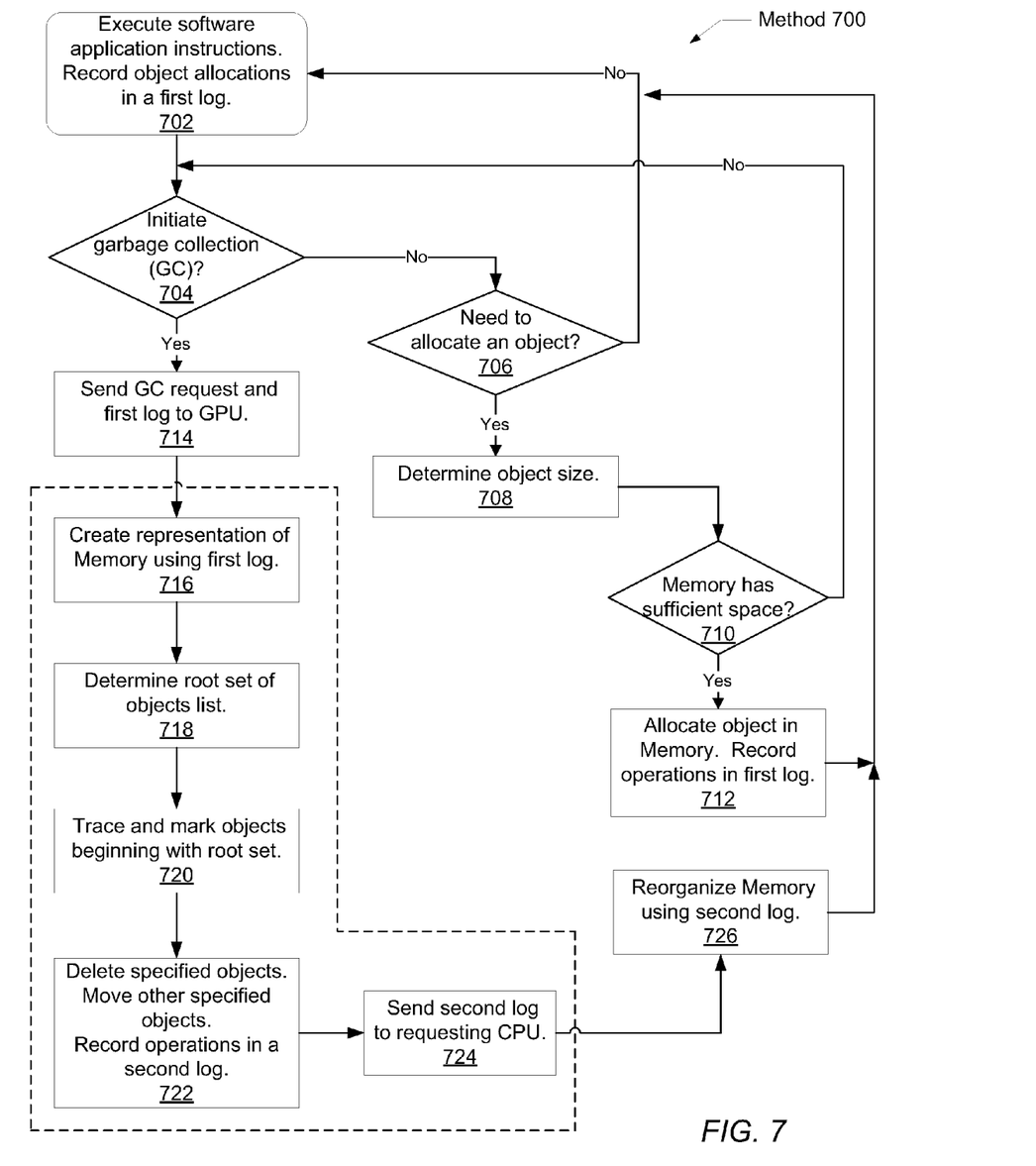
FIG. 7 is a flow diagram of one embodiment of a method for efficient garbage collection.

Turning now to FIG. 7, one embodiment of a method 700 for performing garbage collection with a separate special processing core is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 702, instructions of one or more software applications are being executed. In one embodiment, one of the software applications is a multimedia application. During execution, a first log may be maintained in memory of each allocated data object. For example, the first log may include an entry for each allocated data object that comprises the data object name, address, size, and other. In one embodiment, the first log may be maintained by general-purpose processor cores 112, which are executing the software applications.

In conditional block 704, a determination may be made to begin a garbage collection thread. Different requirements may be used to determine when to begin this garbage collection thread such as the amount of free memory, such as in system memory 130, is below a predetermined threshold; a cyclic period has been reached, or other. If it is determined that garbage collection is not to be initiated (conditional block 704), then as instructions are executed, a data object may need to be allocated (conditional block 706). If this is not the case, then execution of the applications continues in block 702. Otherwise, the required data size of the object is determined in block 708.

If it is determined that system memory does not have sufficient space for the new allocated data object (conditional block 710), then control flow of method 700 returns to conditional block 704. Otherwise, the data object is allocated in memory in block 712. Also, an entry in the first log is updated with information regarding the newly allocated data object. Then control flow of method 700 returns to block 702.

If it is determined that the garbage collection algorithm needs to be started (conditional block 704), then, in block 714, a general-purpose processing unit, such as CPU 115, may send a garbage collection request to a special processing unit, such as GPU 510. Also, the first log may be sent to the special processing unit. In one embodiment, CPU 115 may reside in the same processing node 500 as GPU 510. In another embodiment, the requesting CPU 115 may reside in a different processing node 500 as GPU 510 and interface 140 may be utilized.

In block 716, the special processing unit may create a representation of system memory, such as memory 130. For example, the special processing unit, such as GPU 510, may map data objects in system memory 130 to local memory, such as buffers 514 and/or storage within graphics processor core 512. In one embodiment, this mapping may be a one-to-many model of GPU 510 memory mapped on to system memory 510. This mapping, or scaling, may allow for much larger heaps than if the mapping was a one-to-one model, since there is less GPU 510 memory. Therefore, a mapping is created of a smaller number of bytes on the GPU memory to a larger number of bytes on main system memory, such as memory 130. The GPU then scales the incoming sizes in the first log to shrink by the necessary ratio. Again, this allows for significantly larger heaps on a virtual machine to be able to be mapped onto the GPU, although there is some overhead in scaling the value. In another embodiment, this mapping is a one-to-one model of system memory mapped on to the GPU memory and there is no mapping overhead. Then the special processing unit (SPU) may iterate over the list of operations in the received first log and apply them to its internal data structure representing the heap of the requesting general-purpose CPU.

The garbage collection algorithm may now reside on the special processing unit, such as GPU 510, and a general-purpose processing unit may not need to perform the garbage collection itself. For example, the special processing unit (SPU) may generally begin the garbage collection algorithm by determining a list of the root set of data objects in block 718. In block 720, the SPU may scan, or trace, its object list and mark data objects according to the chosen algorithm, such as a tri-color algorithm or other.

Data objects specified for removal, or as "dead", may be deleted in block 722. Compaction may follow, wherein the remaining "live" data objects are moved to memory locations in an attempt to create contiguous blocks for easier memory management. The list of necessary changes to free the "dead" objects, such as all operations for deletion, moving, and other, may be recorded in a second log in memory storage of the SPU.

Garbage collection is an extremely parallel task that requires iterating over all available data objects. The operations of the garbage collection algorithm may be performed more efficiently by a SPU than a general-purpose CPU due to the parallel architecture of a SPU. Therefore, the pause, or delay, in the execution of a software application, such as a multimedia application, due to garbage collection may be greatly reduced. Also, the cache subsystems, such as subsystems 114 and 118, are not used for garbage collection. Therefore, useful data does not need to be evicted from the caches during the execution of the garbage collection algorithm. Upon completion of the pause and return to the execution of the software application, useful data does not need to be reloaded into the cache subsystems.

Upon completion of the garbage collection algorithm by the SPU, the second log is sent to the requesting general-purpose CPU in block 724. The list of changes in the second log are processed by the general-purpose CPU in block 726, which frees up space within the heap. In the case where the garbage collection algorithm was begun due to insufficient memory space for a new data object, a free pointer may now point to a sufficiently sized area in system memory so that the managed environment may now allocate the new object. If there still is not sufficient space, then the managed environment may perform an "out of memory" exception, which is the current solution without SPU acceleration.

Pseudocode representing an embodiment of a garbage collection method utilizing a GPU follows,

```
// pseudocode for Garbage Collection code          /* line 18 */
allocation (Object newObj) {
    if (checkHeapSpace (newObj.getSize ( ) ) == true) {   /* line 20 */
        Address newObjDest = allocate(newObj);
        diffOfAllocate.add(newObjDest, newObj.getSize( ));
    }
    else {
        gpuCollector(diffOfAllocate);                /* line 25 */
        if (checkHeapSpace(newObj.getSize( )) == true) {
            Address newObjDest = allocate(newObj);
            diffOfAllocate.add(newObjDest, newObj.getSize( ));
        }
        else { throwOutOfMemoryException( ); }       /* line 30 */
    }
}                                                    /* line 32 */
```

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A microprocessor comprising:
a general purpose central processing unit (CPU);
a special processing unit (SPU); and
a memory;
wherein the CPU is configured to send a garbage collection request to free space in the memory and a first log to the SPU, in response to determining a garbage collection initiate condition is satisfied;
wherein in response to receiving the garbage collection request, the SPU is configured to:
create a representation of the memory in a local memory within the SPU;
perform a first set of operations corresponding to a garbage collection algorithm on data objects within the local memory representing data objects identified by the first log; and
record a second set of operations in a second log, wherein the second set reorganizes the data objects in the local memory to free space within the local memory;
wherein in response to receiving the second log from the SPU, the CPU is configured to perform operations identified by the second log to free space in the memory.

2. The microprocessor as recited in claim 1, wherein the first log comprises a plurality of entries, each entry comprising an address and a data size of each allocated data object stored in a heap in memory.

3. The microprocessor as recited in claim 1, wherein the SPU comprises a single instruction multiple data (SIMD) parallel architecture.

4. The microprocessor as recited in claim 3, wherein the SPU is a graphics processing unit (GPU).

5. The microprocessor as recited in claim 1, wherein performing the operations identified by the second log comprises deleting dead data objects and moving remaining live data objects in the memory.

6. The microprocessor as recited in claim 5, wherein to create the representation of the memory, the SPU is further configured to perform scaling in order to map a smaller number of bytes in the local memory of the SPU to a larger number of bytes in the memory.

7. The microprocessor as recited in claim 6, wherein the SPU is further configured to scale an incoming size corresponding to a data object identified in the first log by a ratio used to map the local memory to the memory.

8. The microprocessor as recited in claim 6, wherein the garbage collection initiate condition comprises a condition wherein the memory has less free space than a size of a new data object to be allocated by the CPU.

9. A method for garbage collection, the method comprising:
sending a garbage collection request to free space in a memory and a first log from a general purpose central processing unit (CPU) to a special processing unit (SPU), in response to determining a garbage collection initiate condition is satisfied;
creating a representation of the memory in a local memory within the SPU;
performing by the SPU a first set of operations corresponding to a garbage collection algorithm on data objects within the local memory representing data objects identified by the first log;
recording a second set of operations in a second log, wherein the second set reorganizes the data objects in the local memory to free space within the local memory;
wherein in response to receiving the second log from the SPU, the method further comprises the CPU performing operations identified by the second log to free space in the memory.

10. The method as recited in claim 9, wherein the first log comprises a plurality of entries, each entry comprising an address and a data size of each allocated data object stored in a heap in a memory.

11. The method as recited in claim 9, wherein the SPU comprises a single instruction multiple data (SIMD) parallel architecture.

12. The method as recited in claim 11, wherein the SPU is a graphics processing unit (GPU).

13. The method as recited in claim 9, wherein performing the operations identified by the second log comprises deleting dead data objects and moving remaining live data objects in the memory.

14. The method as recited in claim 13, wherein to create the representation of the memory, further comprising performing scaling in order to map a smaller number of bytes in the local memory of the SPU to a larger number of bytes in the memory.

15. The method as recited in claim 14, wherein the garbage collection initiate condition comprises a condition wherein the memory has less free space than a predetermined threshold.

16. The method as recited in claim 14, further comprising scaling an incoming size corresponding to a data object identified in the first log by a ratio used to map the local memory to the memory.

17. A computing system comprising:
a first processing node comprising a general purpose central processing unit (CPU);
a memory coupled to the first processing node; and
a second processing node comprising a special processing unit (SPU);
wherein the CPU is configured to send a garbage collection request to free space in the memory and a first log to the SPU, in response to determining a garbage collection initiate condition is satisfied; and
wherein in response to receiving the garbage collection request, the SPU is configured to:
create a representation of the memory in a local memory within the SPU;
perform a first set of operations corresponding to a garbage collection algorithm on data objects within the local memory representing data objects identified by the first log; and
record a second set of operations in a second log, wherein the second set reorganizes the data objects in the local memory to free space within the local memory;
wherein in response to receiving the second log from the SPU, the CPU is configured to perform operations identified by the second log to free space in the memory.

18. The computing system as recited in claim 17, wherein the SPU comprises a single instruction multiple data (SIMD) parallel architecture.

19. The computing system as recited in claim 18, wherein the first log comprises a plurality of entries, each entry comprising an address and a data size of each allocated data object stored in a heap in memory.

20. The computing system as recited in claim 17, wherein performing the operations identified by the second log comprises deleting dead data objects and moving remaining live data objects in the memory.

21. The microprocessor as recited in claim 1, wherein the second log comprises a list of necessary changes to free dead data objects.

\* \* \* \* \*